US010355596B2

(12) United States Patent
Choquet

(10) Patent No.: US 10,355,596 B2
(45) Date of Patent: Jul. 16, 2019

(54) BUCK-BOOST CONVERTER

(71) Applicant: Dialog Semiconductor (UK) Limited, London (GB)

(72) Inventor: Frederic Choquet, Ostfildern-Kemnat (DE)

(73) Assignee: Dialog Semiconductor (UK) Limited, London (GB)

( * ) Notice: Subject to any disclaimer, the term of this patent is extended or adjusted under 35 U.S.C. 154(b) by 68 days.

(21) Appl. No.: 15/232,361

(22) Filed: Aug. 9, 2016

(65) Prior Publication Data

US 2017/0155324 A1    Jun. 1, 2017

(30) Foreign Application Priority Data

Nov. 30, 2015 (DE) .......................... 10 2015 223 768

(51) Int. Cl.
*H02M 3/158*    (2006.01)
(52) U.S. Cl.
CPC ......... *H02M 3/1582* (2013.01); *H02M 3/158* (2013.01)
(58) Field of Classification Search
CPC . H02M 2001/0045; H02M 2001/0032; H02M 2001/0012; H02M 3/158; H02M 3/1588; H02M 3/1582; H02M 3/1584; H02M 3/156; H02M 3/07; H02M 3/33507; H02M 3/157; H02M 3/155; G05F 1/24; G05F 1/613; G05F 1/56; G05F 1/575
USPC ....... 323/223–225, 259, 268, 271, 272, 282, 323/284–288
See application file for complete search history.

(56) References Cited

U.S. PATENT DOCUMENTS

| | | | |
|---|---|---|---|
| 8,018,212 B1* | 9/2011 | Petricek .............. | H02M 3/1582 323/259 |
| 9,998,009 B1* | 6/2018 | Lai ........................ | H02M 3/157 |
| 2008/0303502 A1* | 12/2008 | Haiplik ............... | H02M 3/1582 323/283 |

(Continued)

OTHER PUBLICATIONS

German Office Action, File No. 10 2015 223 768.0, Applicant: Dialog Semiconductor (UK) Limited, dated Jun. 8, 2016, 6 pgs and English language translation, 5 pgs.

(Continued)

*Primary Examiner* — Jue Zhang
*Assistant Examiner* — Kevin H Sprenger
(74) *Attorney, Agent, or Firm* — Saile Ackerman LLC; Stephen B. Ackerman

(57) ABSTRACT

A buck-boost converter and a method are presented. The buck-boost converter comprises an inductor, a buck converter, and a boost converter. The buck converter controls switches according to a buck duty cycle, whereas the boost converter controls switches according to a boost duty cycle. The converter contains a voltage feedback loop for regulating an output voltage of the converter. A buck comparator generates the buck duty cycle signal by comparing the error voltage with a ramp voltage. A boost comparator generates the boost duty cycle signal by comparing a boost error voltage with the ramp voltage, wherein the boost error voltage is indicative of a sum of the error voltage and an offset voltage and the boost ramp voltage is indicative of a sum of the ramp voltage and the offset voltage. There is a duty cycle feedback loop for adjusting the buck and boost duty cycles.

17 Claims, 8 Drawing Sheets

(56) References Cited

U.S. PATENT DOCUMENTS

| | | | |
|---|---|---|---|
| 2009/0262556 A1* | 10/2009 | Tomiyoshi | H02M 3/1582 363/17 |
| 2010/0231189 A1 | 9/2010 | Chen et al. | |
| 2010/0320992 A1* | 12/2010 | Dearn | H02M 3/1582 323/311 |
| 2011/0043172 A1 | 2/2011 | Dearn | |
| 2011/0227550 A1* | 9/2011 | Walters | H02M 3/1582 323/283 |
| 2012/0032658 A1* | 2/2012 | Casey | H02M 3/1582 323/271 |
| 2012/0105038 A1* | 5/2012 | Chen | H02M 3/156 323/283 |
| 2012/0153915 A1* | 6/2012 | Loikkanen | G05F 1/618 323/283 |
| 2014/0218001 A1* | 8/2014 | Dally | G05F 1/618 323/285 |
| 2014/0225579 A1* | 8/2014 | Dally | G05F 1/10 323/271 |

OTHER PUBLICATIONS

"Design of an Average-Current-Mode Noninverting Buck-Boost DC-DC Converter With Reduced Switching and Conduction Losses," by Chia-Ling et al., IEEE Transactions on Power Electronics, vol. 27, No. 12, Dec. 2012, pp. 4934-4943.

"A High Efficiency Current Mode Step-Up/Step-Down DC-DC Converter With Smooth Transition," by Yanzhao Ma et al., 2011 IEEE 9th International Conference on ASIC (ASICON), Oct. 25-28, 2011, 4 pgs.

\* cited by examiner

Buck-Boost Control Implementation

BUCK-BOOST CONVERTER

TECHNICAL FIELD

This document relates to buck-boost converters and methods for operating buck-boost converters. Specifically, the document relates to a buck-boost converter comprising a buck converter with two switches and a boost converter with two switches for regulating an output voltage of the buck-boost converter.

BACKGROUND

There is an increasing interest in portable electronic devices capable of operating over the full voltage range of their battery to optimize operating time of the device. Since integrated circuits included in those devices need regulated voltages, the usage of DC-DC converters able to work over this wide voltage range becomes more and more crucial. Buck-boost converters are DC-DC converters which may fulfill the latter requirements. They are able to provide a regulated-down voltage by operating in buck mode when the battery voltage is higher than the required output voltage, e.g. when the battery is fully charged. The other way round, buck-boost converters are able to provide a regulated up-voltage by operating in boost mode when the required output voltage is higher than the battery voltage, e.g. when the battery is discharged.

FIG. 6 shows a popular architecture of a buck-boost converter which is based on four switches connected to a power coil. As illustrated in FIG. 6, in buck mode, switches S1 and S2 are activated with a given duty cycle while switch S4 is permanently on and switch S3 is permanently off. The current flow through the buck-boost converter is illustrated by two dashed arrows 1, 2 which indicate the two different phases occurring during each clock cycle. In the boost mode illustrated in FIG. 7, only switches S3 and S4 are activated while switch S1 is permanently on and switch S2 is permanently off. When the battery has an intermediate voltage, the buck-boost converter can work in buck-boost mode, by activation of all switches in three consecutive phases during a single clock cycle. In FIG. 8, these three phases are indicated by three dashed arrows 1, 2, 3.

FIG. 9 depicts a possible buck-boost control implementation for regulating the output voltage of the buck-boost converter. The control implementation comprises a feedback loop for determining a duty cycle for switching switches S1 and S2 (denoted as duty-buck) and a duty cycle for switching switches S3 and S4 (denoted as duty-boost) based on the output voltage of the converter. The respective duty cycles of the different phases are determined by the comparison of two internal voltages: the error voltage, which results from the amplification of the difference between the output voltage and the target voltage, and a voltage ramp generated by a ramp generator synchronized and periodically reseted by a master clock.

A problem when designing buck-boost converters is to provide a mechanism for determining in which mode (buck mode, boost mode, or buck-boost mode) the converter shall operate to provide the requested output voltage under the requested current load. This mechanism should also exhibit low power losses and smooth transitions between the different modes.

A simple approach is illustrated in FIG. 10 and comprises monitoring the input voltage using two comparators to determine in which operation mode the DC-DC converter should operate. If the input voltage VIN is higher than the target voltage VOUT, the buck mode is selected and the DC-DC converter is forced to operate in this mode. If the input voltage VIN is lower than the target voltage VOUT, the boost mode is selected. The drawback of this approach is that the mode selection does not take into account the load current and the voltage drop across the switches. Since the status of the regulation loop (such as e.g. the present duty cycles) is not taken into account, it is helpful to set a buck-mode voltage threshold (denoted as buck vth) and a separate boost-mode voltage threshold (denoted as boost vth) to account for a maximum output current. This can lead to the setting of a wide buck-boost mode operation area. This architecture, by construction, is not optimal for all current and voltage ranges and can create large output voltage glitches when a change of mode occurs.

SUMMARY

The present disclosure provides a voltage mode buck-boost converter with an inductor, a buck converter comprising a first switch and a second switch which are coupled to an input terminal of the inductor, and a boost converter comprising a third switch and a fourth switch which are coupled to an output terminal of the inductor. The buck converter is configured to control the first switch and the second switch according to a buck duty cycle based on a buck duty cycle signal, and the boost converter is configured to control the third switch and the fourth switch according to a boost duty cycle based on a boost duty cycle signal.

In general, a duty cycle signal is a periodic signal which remains in a high state during a first time interval and in a low state during a second time interval. The period of the duty cycle signal, i.e. the sum of the first and the second time interval, is denoted as clock cycle. The duty cycle signal may be a pulse wave (rectangular wave) signal which alternately switches between the high state and the low state. The buck duty cycle signal may be synchronized with the boost duty cycle signal in a sense that both signals have the same period and the rising edges to the high states occur at the same points in time.

The duty cycles, on the other hand, are real numbers between 0 and 1 or, alternatively, percentages between 0% and 100%. A duty cycle represents the ratio between the time the respective duty cycle signal is in the high state and the time the signal is in the low state.

Each converter controls its both switches based on the respective duty cycle signal by alternately turning on one of the switches while the other switch is turned off. For instance, the buck converter may close the first switch and open the second switch when the buck duty cycle signal is in the high state and open the first switch and close the second switch when the buck duty cycle signal is in the low state. Similarly, the boost converter may e.g. close the third switch and open the fourth switch when the boost duty cycle signal is in the high state and open the third switch and close the fourth switch when the boost duty cycle signal is in the low state.

The proposed buck-boost converter comprises a voltage feedback loop for regulating an output voltage at an output of the buck-boost converter. The voltage feedback loop comprises an error voltage determination unit, a buck comparator, a boost comparator, and a duty cycle feedback loop. The error voltage determination unit is configured to determine an error voltage indicative of a difference between the output voltage and a target voltage. The buck comparator is configured to generate the buck duty cycle signal by comparing the error voltage with a ramp voltage generated by a ramp voltage generator. The boost comparator is configured to generate the boost duty cycle signal by comparing a boost error voltage with the ramp voltage or by comparing the error voltage with a boost ramp voltage, wherein the boost error voltage is indicative of a sum of the error voltage and an offset voltage and the boost ramp voltage is indicative of a sum of the ramp voltage and the offset voltage.

In other words, according to a first alternative, the boost comparator may be configured to generate the boost duty cycle signal by comparing the boost error voltage with the ramp voltage. That is, the boost comparator may be configured in a sense that one input of the boost comparator may be coupled to an output of the ramp voltage generator for applying the ramp voltage to that input. According to the first alternative, the boost error voltage may be applied to the other input of the boost comparator.

According to a second alternative, the boost comparator may be configured to generate the boost duty cycle signal by comparing the error voltage with the boost ramp voltage. That is, the boost comparator may be configured in a sense that one input of the boost comparator may be coupled to an output of the error voltage determination unit for applying the error voltage to that input. According to the first alternative, the boost ramp voltage may be applied to the other input of the boost converter.

Finally, the duty cycle feedback loop is configured to adjust the buck duty cycle and the boost duty cycle. To this end, the duty cycle feedback loop comprise an offset voltage determination unit which is configured to determine the offset voltage based on the buck duty cycle signal generated by the buck comparator and based on the boost duty cycle signal generated by the boost comparator.

The proposed buck-boost converter may be operated only in a buck-boost mode in which the buck-boost converter is configured to switch each of the four switches once per clock cycle from an on-state to an off-state or vice versa. The buck duty cycle and the boost duty cycle are synchronized by a clock signal. The clock signal is periodic with the clock cycle as period. Despite the additional switching losses due to the activation of the four switches at each clock cycle, the proposed buck-boost converter offers good power efficiency on a large voltage range, a very low output voltage ripple due to a smooth transition mechanism which will be explained in the following paragraphs. Specifically, by dynamically adjusting the offset voltage which is added either to the error voltage or to the ramp voltage, the values of the buck duty cycle and the boost duty cycle may be optimized. Moreover, the proposed buck-boost converter shows good load regulation performances and a perfectly controlled output voltage ripple spectrum. Another benefit of the proposed converter is that it enables the most power efficient switching behavior of the four switches regardless of the input voltage and output load current conditions of the converter.

The ramp generator, which is not necessarily part of the buck-boost converter, periodically outputs the ramp voltage that repeatedly rises in accordance with a positive ramp slope until a given upper ramp voltage level is reached and subsequently falls in accordance with a negative ramp slope until a given lower ramp voltage level is reached. Any of the positive ramp slope, the negative ramp slope, the upper ramp voltage level and the lower ramp voltage level may be variable.

The buck-boost converter may comprise an error adder unit coupled to both an output of the offset voltage determination unit and an output of the error voltage determination unit. The error adder unit is configured to generate the boost error voltage by adding the offset voltage and the error voltage, and to connect the boost error voltage to an input of the boost comparator. At the other input of the boost comparator, the ramp voltage may be applied. In this embodiment, the boost comparator compares the ramp voltage with the boost error voltage.

In the alternative embodiment, the boost comparator compares the error voltage, which is directly applied to a first input of the boost comparator, with a boost ramp voltage. To this end, the output of the error voltage determination unit may be coupled to the first input of the boost comparator. The boost ramp voltage may be generated by a further adder unit which generates the boost ramp voltage by summing the ramp voltage and the offset voltage. Alternatively, in case the ramp generator is part of the buck-boost converter, the ramp generator may directly generate the boost ramp voltage. In this case, both the upper ramp voltage level and the lower ramp voltage level may be shifted by the offset voltage, which may be directly applied to the ramp generator by coupling the output of the offset voltage determination unit to an input of the ramp generator.

The offset voltage determination unit may be configured to determine the offset voltage such that the boost duty cycle is regulated towards a minimum boost duty cycle or such that the buck duty cycle is regulated towards a maximum buck duty cycle. In general, the buck-boost converter cannot sustain too big or too small duty cycles. Both the minimum boost duty cycle and the maximum buck duty cycle are parameters which may be determined based on the specific design, the intended application scenario and the desired efficiency of the buck-boost converter. Which of the both regulations is applied depends on the actual buck and boost duty cycles.

For example, the offset voltage determination unit may be configured to determine the offset voltage such that the boost duty cycle is regulated towards a minimum boost duty cycle when a buck duty cycle is smaller than a maximum buck duty cycle. This behavior may be achieved by providing the offset voltage determination unit with a duty cycle selector and a control unit. The duty cycle selector is configured to couple, when the buck duty cycle is smaller than the maximum buck duty cycle, the boost duty cycle signal as a controlled variable to the control unit and the minimum boost duty cycle as a set point to the control unit, and the control unit is configured to determine the offset voltage based on the boost duty cycle signal and the minimum boost duty cycle. To be more specific, the control unit determines the offset voltage such that the boost duty cycle is regulated towards the minimum boost duty cycle. The control unit may comprise a proportional, an integral or a derivative controller or a combination of the latter controllers.

Moreover, the offset voltage determination unit may be configured to determine the offset voltage such that the buck duty cycle is regulated towards a maximum buck duty cycle when a buck duty cycle is larger than a maximum buck duty cycle. To achieve this behavior of the offset voltage determination unit, the duty cycle selector is configured to couple, when the buck duty cycle is larger than the maximum buck duty cycle, the buck duty cycle signal as a controlled variable to the control unit and the maximum buck duty cycle as a set point to the control unit, and the control unit is configured to determine the offset voltage based on the buck duty cycle signal and the maximum buck duty cycle.

Furthermore, the offset voltage determination unit may be configured to determine the offset voltage such that the boost duty cycle is regulated towards a minimum boost duty cycle when a boost duty cycle of the boost converter is smaller than the minimum boost duty cycle. To achieve this behavior of the offset voltage determination unit, the duty cycle selector is configured to couple, when the boost duty cycle is smaller than the minimum boost duty cycle, the boost duty cycle signal as a controlled variable to the control unit and the minimum boost duty cycle as a set point to the control unit, and the control unit is configured to determine the offset voltage based on the boost duty cycle signal and the minimum boost duty cycle.

Each power converter switch may comprise one or more transistors. For example, a switch may comprise one or more metal-oxide-semiconductor field-effect transistors MOS-FETs which dissipate a low amount of power. The first switch may be located between an input of the converter and the input terminal of the inductor. The second switch may be located between the input terminal of the inductor and ground. The third switch may be located between the output terminal of the inductor and ground. The fourth switch may be located between the output terminal of the inductor and an output of the buck-boost converter.

The offset voltage determination unit may comprise a loop filter configured to smooth the offset voltage at an output of the offset determination unit. Additionally, the loop filter may provide loop stability of the duty cycle feedback loop. Further, the voltage determination unit may form part of a delay line loop DLL.

According to another aspect of the present disclosure, a current-mode buck-boost converter is proposed. The current-mode buck-boost converter comprises, similar as the voltage-mode buck-boost converter, an inductor, a buck converter, and a boost converter. The buck converter comprises a first switch and a second switch which are coupled to an input terminal of the inductor. The buck converter is configured to control the first switch and the second switch according to a buck duty cycle based on a buck duty cycle signal. The boost converter comprises a third switch and a fourth switch which are coupled to an output terminal of the inductor. The boost converter is configured to control the third switch and the fourth switch according to a boost duty cycle based on a boost duty cycle signal. Further, the current-mode buck-boost converter comprises a voltage feedback loop for regulating an output voltage at an output of the buck-boost converter. The voltage feedback loop comprises an error voltage determination unit, a buck comparator, a boost comparator, and a duty cycle feedback loop for adjusting the buck duty cycle and the boost duty cycle. The error voltage determination unit is configured to determine an error voltage indicative of a difference between the output voltage and a target voltage. The buck comparator is configured to generate the buck duty cycle signal by comparing the error voltage with an inductor input voltage indicative of a current at the input terminal of the inductor. The boost comparator is configured to generate the boost duty cycle signal by comparing a boost error voltage with an inductor output voltage or by comparing the error voltage with a boost inductor output voltage, wherein the inductor output voltage is indicative of a current at the output terminal of the inductor, the boost error voltage is indicative of a sum of the error voltage and an offset voltage, and the boost inductor output voltage is indicative of a sum of the inductor output voltage and the offset voltage.

In other words, according to a first alternative, the boost comparator may be configured to generate the boost duty cycle signal by comparing the boost error voltage with the inductor output voltage. According to a second alternative, the boost comparator may be configured to generate the boost duty cycle signal by comparing the error voltage with the boost inductor output voltage.

Finally, the duty cycle feedback loop comprises an offset voltage determination unit configured to determine the offset voltage based on the buck duty cycle signal generated by the buck comparator and based on the boost duty cycle signal generated by the boost comparator.

According to a further aspect of the present disclosure, a method for operating a voltage mode buck-boost converter is proposed. The voltage mode buck-boost converter is supposed to include an inductor, a buck converter comprising a first switch and a second switch which are coupled to an input terminal of the inductor, and a boost converter comprising a third switch and a fourth switch which are coupled to an output terminal of the inductor. The method comprises controlling the first switch and the second switch according to a buck duty cycle based on a buck duty cycle signal and controlling the third switch and the fourth switch according to a boost duty cycle based on a boost duty cycle signal. The method further comprises determining an error voltage indicative of a difference between an output voltage at an output of the buck-boost converter and a target voltage and generating the buck duty cycle signal by comparing the error voltage with a ramp voltage. The boost duty cycle signal is generated by comparing a boost error voltage with the ramp voltage or by comparing the error voltage with a boost ramp voltage, wherein the boost error voltage is indicative of a sum of the error voltage and an offset voltage and the boost ramp voltage is indicative of a sum of the ramp voltage and the offset voltage. A duty cycle feedback loop adjusts the buck duty cycle and the boost duty cycle by determining the offset voltage based on the buck duty cycle signal and based on the boost duty cycle signal.

According to a further aspect of the present disclosure, a method for operating a current mode buck-boost converter is proposed. The current mode buck-boost converter is also supposed to include an inductor, a buck converter comprising a first switch and a second switch which are coupled to an input terminal of the inductor, and a boost converter comprising a third switch and a fourth switch which are coupled to an output terminal of the inductor. The method comprises controlling the first switch and the second switch according to a buck duty cycle based on a buck duty cycle signal and controlling the third switch and the fourth switch according to a boost duty cycle based on a boost duty cycle signal. The method further comprises determining an error voltage indicative of a difference between an output voltage at an output of the buck-boost converter and a target voltage. The buck duty cycle signal is generated by comparing the error voltage with an inductor input voltage indicative of a current at the input terminal of the inductor, whereas the boost duty cycle signal is generated by comparing a boost error voltage with an inductor output voltage or by comparing the error voltage with a boost inductor output voltage, wherein the inductor output voltage is indicative of a current at the output terminal of the inductor, the boost error voltage is indicative of a sum of the error voltage and an offset voltage, and the boost inductor output voltage is indicative of a sum of the inductor output voltage and the offset voltage. A duty cycle feedback loop adjusts the buck duty cycle and the boost duty cycle by determining the offset voltage based on the buck duty cycle signal and based on the boost duty cycle signal.

The voltage feedback loop may comprise various analog or digital circuit components such as e.g. operational amplifiers for implementing the error voltage is determination unit, the comparators or the ramp voltage generator. Similarly, the duty cycle feedback loop may comprise various analog or digital circuit components such as e.g. digital control logic for implementing the duty cycle selector, the multiplexer or the control unit.

It should be noted that the methods and apparatuses including its preferred embodiments as outlined in the present document may be used stand-alone or in combination with the other methods and apparatuses disclosed in this document. In addition, the features outlined in the context of an apparatus are also applicable to a corresponding method. Furthermore, all aspects of the methods and apparatuses outlined in the present document may be arbitrarily combined. In particular, the features of the claims may be combined with one another in an arbitrary manner.

In the present document, the terms "couple", "coupled", "connect", and "connected" refer to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein FIG. 1 schematically illustrates an exemplary buck-boost converter.

DESCRIPTION

Figure 1:
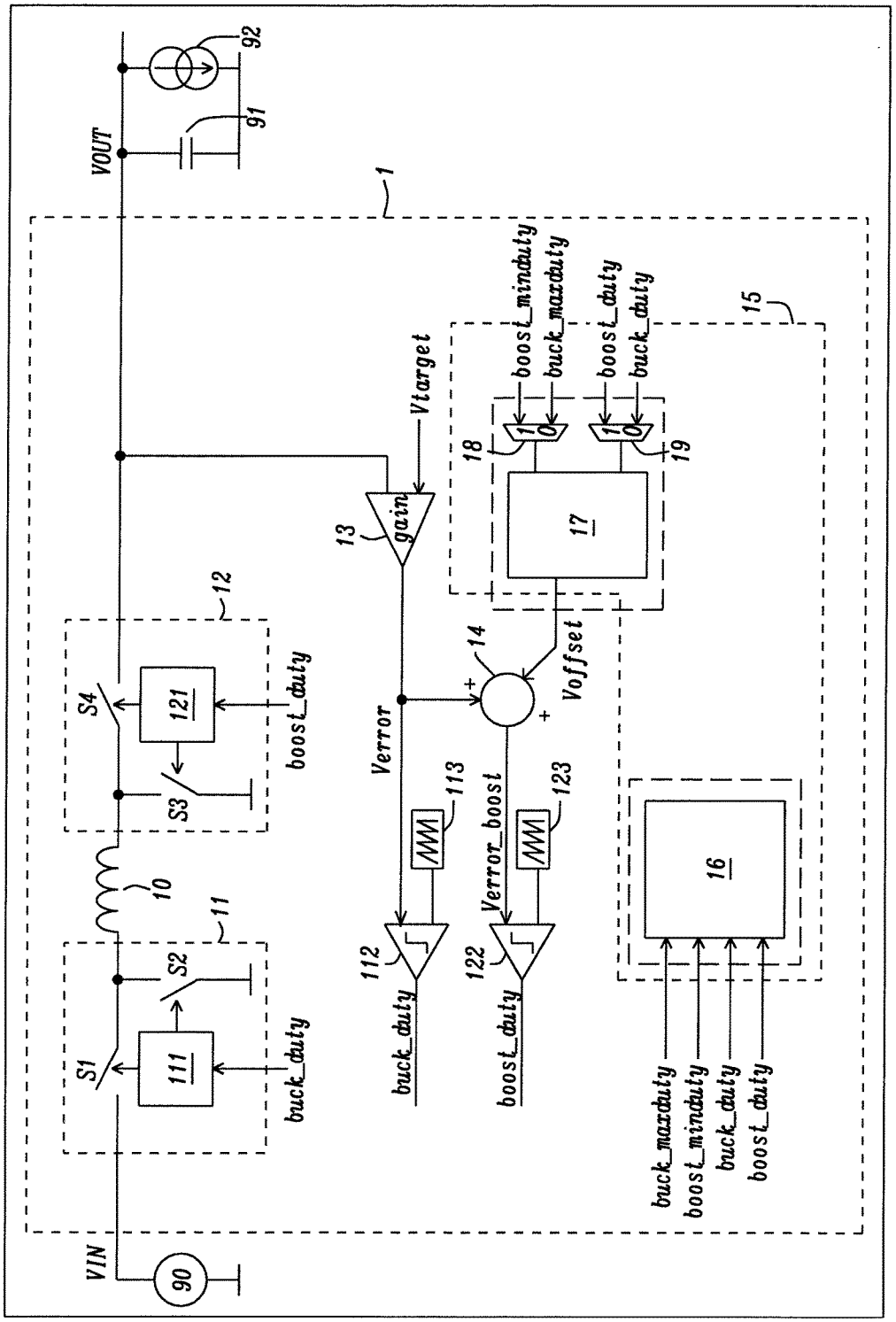

FIG. 1 schematically illustrates an exemplary voltage mode buck-boost DC-DC converter 1. The buck-boost converter 1 comprises a buck converter part 11 and a boost converter part 12 which are coupled via an inductor/coil 10. A power source 90 is coupled to the input of the buck converter part 11 and provides an input voltage VIN. Between the power source 90 and an input terminal of the inductor 10, a first switch S1 of the buck converter part 11 is arranged. A second switch S2 of the buck converter part 11 is arranged between the input terminal of the inductor 10 and ground. In the depicted example, a dedicated buck control unit 111 is responsible for switching switches S1 and S2 in accordance with a buck duty cycle signal, which is denoted as buck_duty in FIG. 1. For instance, the buck control unit 111 may be configured to close the first switch S1 and open the second switch S2 triggered by a rising edge of the buck duty cycle signal, and to open the first switch S1 and close the second switch S2 triggered by a falling edge of the buck duty cycle signal.

A load may be coupled to the output of the buck-boost converter 1, wherein the buck-boost converter 1 provides a regulated output voltage VOUT to the load. In FIG. 1, a capacitor 91 and a current source 92 are illustrated at the output of the buck-boost converter 1. Between the output of the buck-boost converter 1 and an output terminal of the inductor 10, a fourth switch S4 of the boost converter part 12 is arranged. A third switch S3 of the boost converter part 12 is arranged between the output terminal of the inductor 10 and ground. In the depicted example implementation, a dedicated boost control unit 121 is responsible for switching switches S3 and S4 in accordance with a boost duty cycle signal, which is denoted as boost_duty in FIG. 1. For instance, the boost control unit 121 may be configured to close the fourth switch S4 and open the third switch S3 triggered by a rising edge of the boost duty cycle signal, and to open the fourth switch S4 and close the third switch S3 triggered by a falling edge of the boost duty cycle signal.

It should be appreciated that different switching patterns of the four switches S1, S2, S3, S4 are possible. Moreover, both the buck converter part 11 and the boost converter part 12 may comprise additional circuit elements as long as the basic structure defined by the four switches S1, S2, S3, S4 is maintained.

The output voltage of the buck-boost converter 1 is regulated using a voltage feedback loop. Within the voltage feedback loop, an error voltage determination unit 13 determines an error voltage Verror by determining and amplifying a difference between the output voltage VOUT and a target voltage Vtarget. The error voltage determination unit 13 may e.g. comprise an operational amplifier.

The output of the error voltage determination unit 13 is coupled to an input of a buck comparator 112 for comparing the error voltage Verror with a ramp voltage generated by a first ramp voltage generator 113. As a result of the comparison, the buck duty cycle signal buck_duty for controlling the buck control unit 111 is generated and applied as input signal to the buck control unit 111.

Similarly, the boost duty cycle signal boost_duty for the boost control unit 121 is generated by comparing, by a boost comparator 122, a ramp voltage generated by a second ramp voltage generator 123 with a boost error voltage Verror_boost. As illustrated in FIG. 1, an adder unit 14 may be coupled to the output of the error voltage determination unit 13 and an output of the offset voltage determination unit 15 for computing the boost error voltage Verror_boost by adding Verror and Voffset to obtain Verror_boost. In the depicted example, a single ramp voltage generator may be used for generating a single ramp voltage which is applied to both comparators 112, 122. Alternatively, as already discussed in the forgoing, instead of adding the offset voltage Voffset to the error voltage Verror, a modified ramp voltage to which the offset voltage Voffset was added may be applied to the boost comparator 122.

Figure 2:
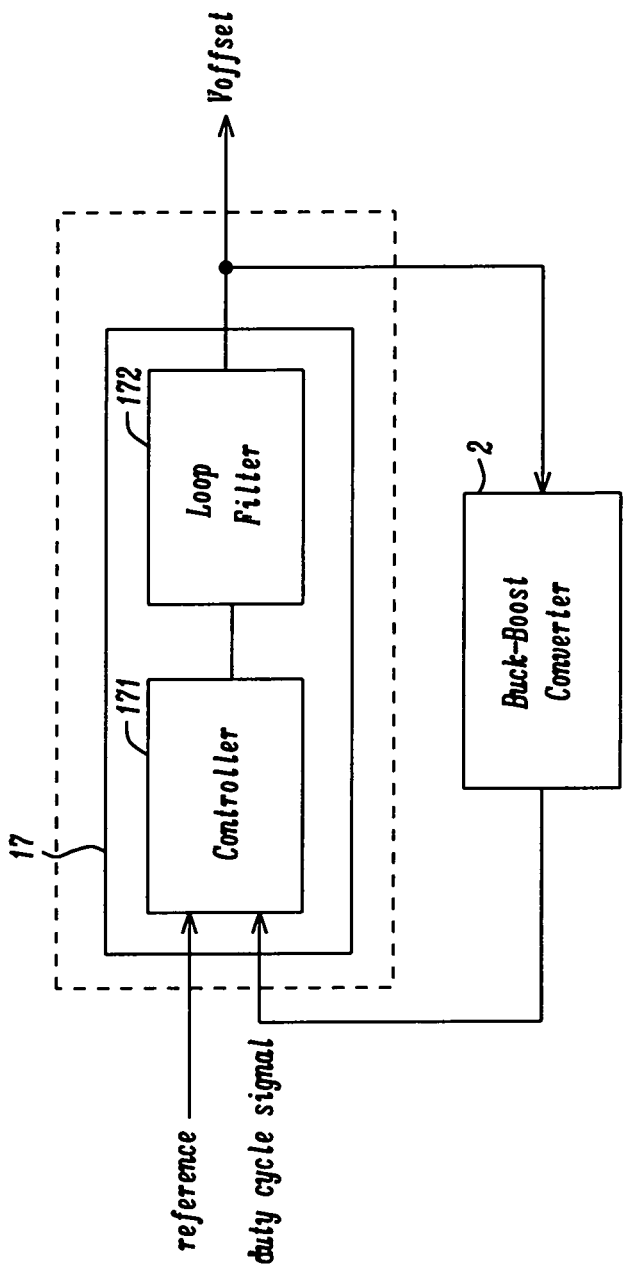
FIG. 2 schematically illustrates parts of a duty cycle feedback loop.

In the depicted example circuit, the offset voltage determination unit 15 comprises a duty cycle selector 16 and a control unit 17. The buck duty cycle signal and the boost duty cycle signal from the output of the comparators 112, 122 are coupled as input signals to both the duty cycle selector 16 and the control unit 17. In other words, the duty cycle selector 16, the control unit 17 and optionally the adder unit 14 form part of a duty cycle feedback loop. This duty cycle feedback loop is also illustrated in FIG. 2 in a different system perspective. In FIG. 2, reference numeral 2 denotes the system reminder of the buck-boost converter 1 of FIG. 1, i.e. all circuit components except those of the offset voltage determination unit 15. According to this system perspective, the offset voltage is applied to the system reminder 2 which outputs buck and boost duty cycle signals which depend on the dynamic of the whole system such as e.g. on the applied offset voltage, the target voltage, the load current, the voltage drop at the switches, and the input voltage at the input of the buck-boost converter. However, although the system reminder 2 returns both duty cycle signals, only one duty cycle signal is coupled to the controller 171 for regulation. It is the task of the duty cycle selector 16 to decide which duty cycle signal is feed back as controlled variable to the controller 171.

A reference value is applied as a set point to controller 171. Again, the reference value is selected by the duty cycle selector 16 and may be either the minimum boost duty cycle or the maximum buck duty cycle. As will be explained in the following, the duty cycle selector 16 selects either the buck duty cycle signal and a maximum buck duty cycle (as reference value) or the boost duty cycle signal and a minimum boost duty cycle (as reference value) as input signals for the controller 171. It is then the task of the controller 171 to adjust the offset voltage such that either the buck duty cycle is regulated towards the maximum buck duty cycle or that the boost duty cycle is regulated towards the minimum boost duty cycle. The controller 171 may be e.g. a proportional, an integral or a derivative controller or a combination thereof.

The reference value may be applied to controller 171 by generating a reference duty cycle signal with a duty cycle corresponding to either the minimum boost duty cycle or the maximum buck duty cycle and applying said reference duty cycle signal to the controller 171. In this situation, the controller 171 may preferably be implemented as integrator which integrates the timing difference between the reference duty cycle signal and the (buck or boost) duty cycle signal of the buck-boost converter 1.

The duty cycle selector 16, which is also part of the duty cycle feedback loop, is not depicted in the schematic view of FIG. 2. Control unit 17 comprises an optional loop filter 172 for smoothing the offset voltage. Additionally, the loop filter 172 may provide loop stability of the duty cycle feedback loop.

Turning back to FIG. 1, besides the buck duty cycle signal and the boost duty cycle signal, the maximum buck duty cycle (denoted as buck_maxduty) and the minimum boost duty cycle (denoted as boost_minduty) are applied at the inputs of the duty cycle selector 16. The output of the duty cycle selector 16 is coupled to both a first multiplexer 18 and a second multiplexer 19. In this way, a logical value generated by the duty cycle selector 16 is used as a control signal for controlling the multiplexers 18, 19. The behavior of the duty cycle selector 16 may be summarized by the following three rules: Firstly, if the buck duty cycle is smaller than the maximum buck duty cycle, the output of the duty cycle selector is e.g. set to "1". Secondly, if the buck duty cycle is larger than the maximum buck duty cycle, the output of the duty cycle selector is e.g. set to "0". And thirdly, if the boost duty cycle is smaller than the minimum boost duty cycle, the output of the duty cycle selector is e.g. set to "1".

Although not displayed in FIG. 1, the output of the duty cycle selector 16 is coupled to a control port of the first multiplexer 18 and a control port of the second multiplexer 19. In case the output of the duty cycle selector is set to "0", the first multiplexer 18 forwards the maximum buck duty cycle as set point (reference value) to the control unit 17. At the same time, the second multiplexer 19 forwards the buck duty cycle signal as controlled variable to the control unit 17. On the other hand, if the output of the duty cycle selector is set to "1", the first multiplexer 18 forwards the minimum boost duty cycle as set point (reference value) to the control unit 17. Synchronously, the second multiplexer 19 forwards the boost duty cycle signal as controlled variable to the control unit 17.

In summary, the described feedback loop can be seen as a delay line loop DLL regulation for dynamically adjusting the offset voltage Voffset. The advantage of the proposed architecture is that the buck-boost converter operates in buck-boost mode but with a minimum required mode overlap. The smooth transition between the buck regulation and the boost regulation is guaranteed by the continuity of the regulation by the duty cycle feedback loop.

Figure 3:
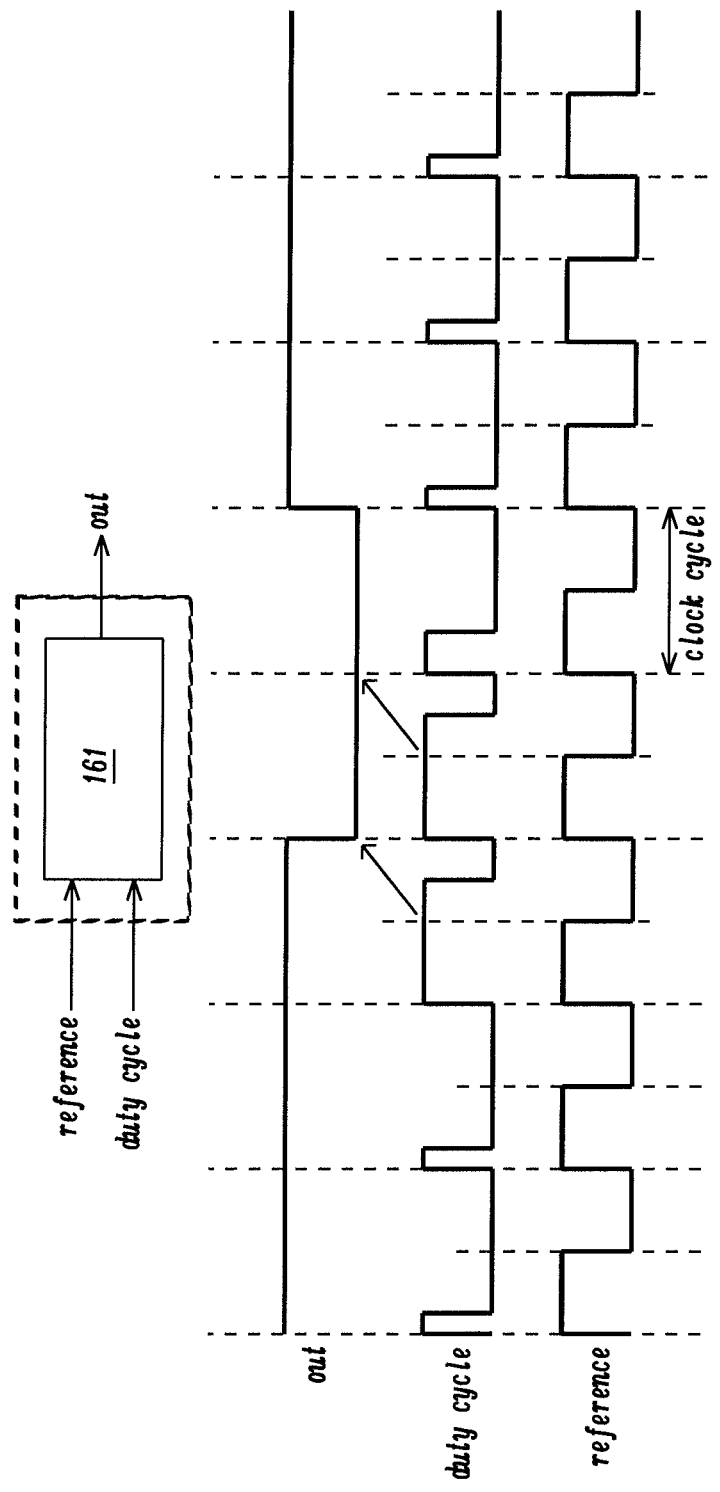
FIG. 3 illustrates an exemplary mode selector behavior of a duty cycle selector.

FIG. 3 illustrates an exemplary mode selector behavior of a subcomponent 161 which may be used within the duty cycle selector 16 to generate logical values for controlling the multiplexers 18, 19. As input signal, a reference signal may be generated whose duty cycle corresponds either to the minimum boost duty cycle or the maximum buck duty cycle. An exemplary reference signal with a duty cycle of approximately 0.5 is displayed in the bottom diagram of FIG. 3. As a second input signal to subcomponent 161, either the buck duty cycle signal or the boost duty cycle signal may be applied. An exemplary duty cycle signal is displayed in the middle diagram of FIG. 3. Subcomponent 161 is configured to detect if the falling edge of a duty cycle signal occurs before or after the falling edge of a reference signal. If the falling edge of the reference signal comes first, the output of subcomponent 161 is set to "0" for the next clock cycle. If the falling edge of the reference signal comes after the falling edge of the duty cycle signal, the output of subcomponent 161 is set to "1" for the next clock cycle. Due to the synchronization of both input signals, whenever the duty cycle of the duty cycle signal is larger than the reference value, a logical "0" is output in the next duty cycle. Analogously, whenever the duty cycle of the duty cycle signal is smaller than the reference value, a logical "1" is output in the next duty cycle. In the example scenario illustrated in FIG. 3, the output of subcomponent 161 is set to "0" in the fourth and fifth clock cycle since the duty cycle exceeds 0.5 in the third and fourth clock cycle. The output of subcomponent 161 is displayed in the top diagram of FIG. 3.

Figure 4:
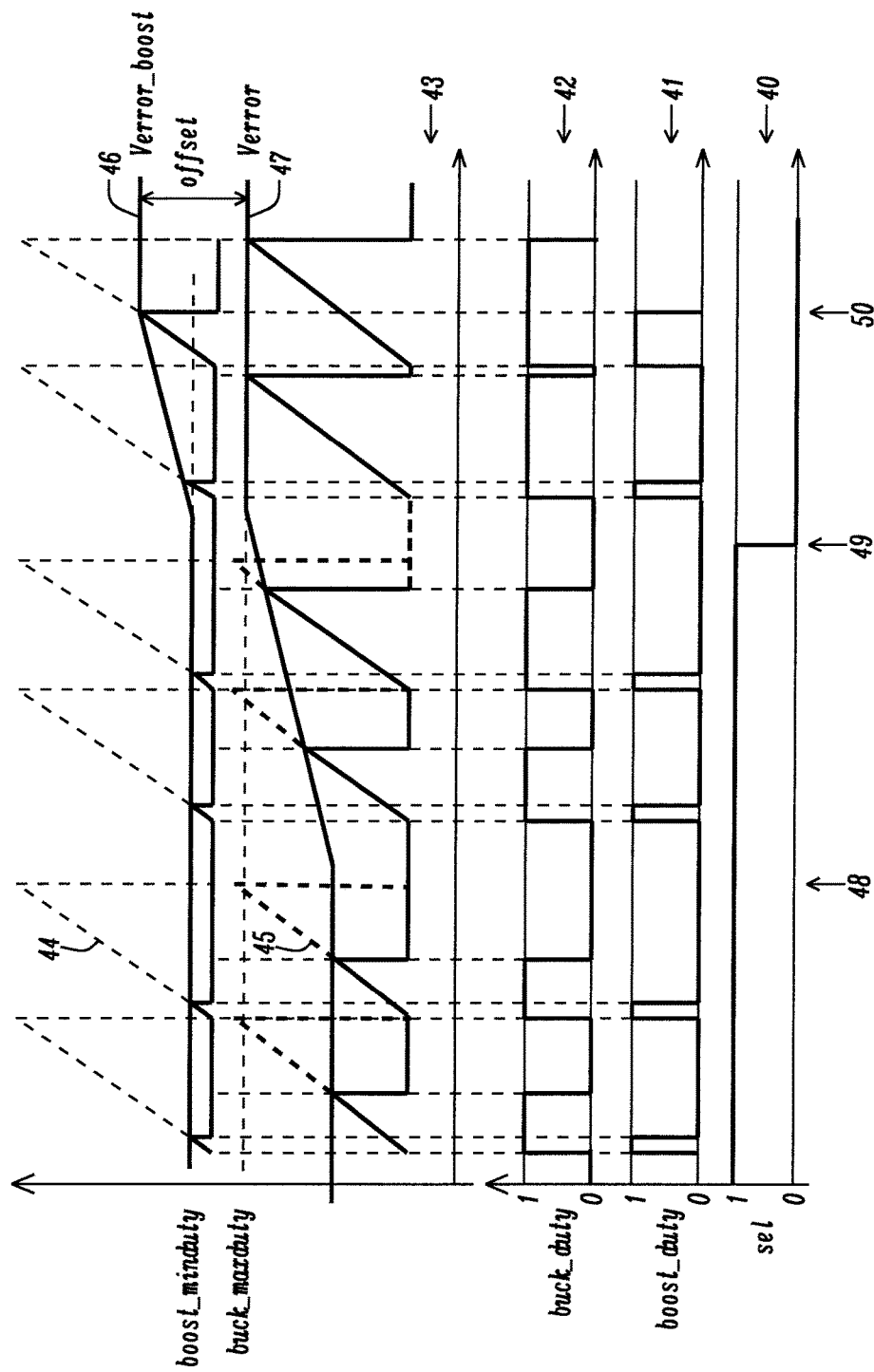
FIG. 4 illustrates an exemplary signal flow within a buck-boost converter.

FIG. 4 illustrates exemplary signal flows over time within the proposed buck-boost converter 1. Diagram 40 illustrates an output signal of the duty cycle selector 16 denoted as sel. Diagram 41 illustrates an exemplary signal flow of the boost duty cycle signal, whereas diagram 42 illustrates an exemplary signal flow of the buck duty cycle signal. In diagram 43, various voltages are displayed: a ramp voltage 44 at the input of the boost comparator 122, a ramp voltage 45 at the input of the buck comparator 112, an error voltage 47 and a boost error voltage 46. In a first time interval until time instance 49, the buck duty cycle is smaller than the maximum buck duty cycle. Thus, the offset voltage determination unit 15 adjusts the offset voltage such that the boost duty cycle is regulated towards the minimum boost duty cycle. At time instance 48 within this first time interval, the error voltage starts increasing, causing the buck duty cycle to increase, too. At time instance 49, the buck duty cycle reaches the maximum buck duty cycle, resulting in a change of the output signal of the duty cycle selector 16 from "1" to "0". The offset voltage determination unit 15 starts to increase the offset voltage until, at time instance 50, the buck duty cycle is regulated at the maximum buck duty cycle. At the same time, the boost duty cycle is increasing.

Figure 5:
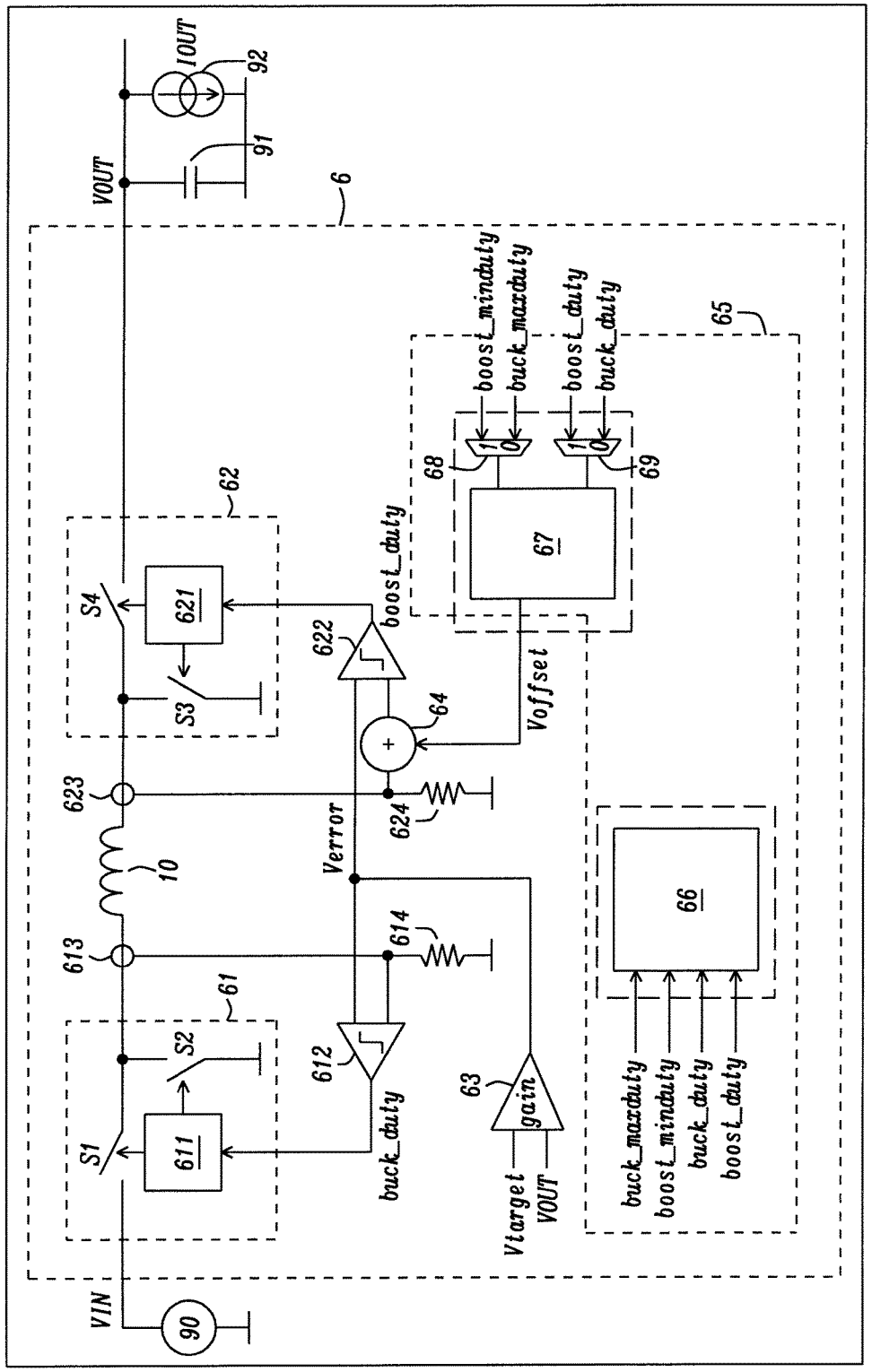
FIG. 5 schematically illustrates another exemplary buck-boost converter.
Figure 6:
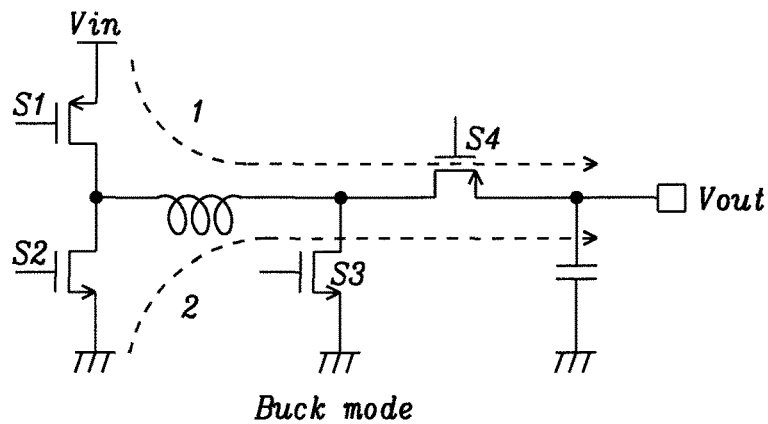
FIG. 6 illustrates a buck-boost converter operating in buck mode.
Figure 7:
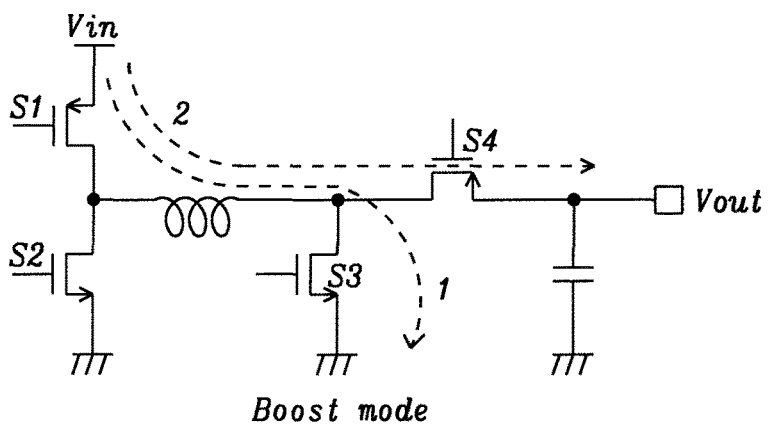
FIG. 7 illustrates a buck-boost converter operating in boost mode.
Figure 8:
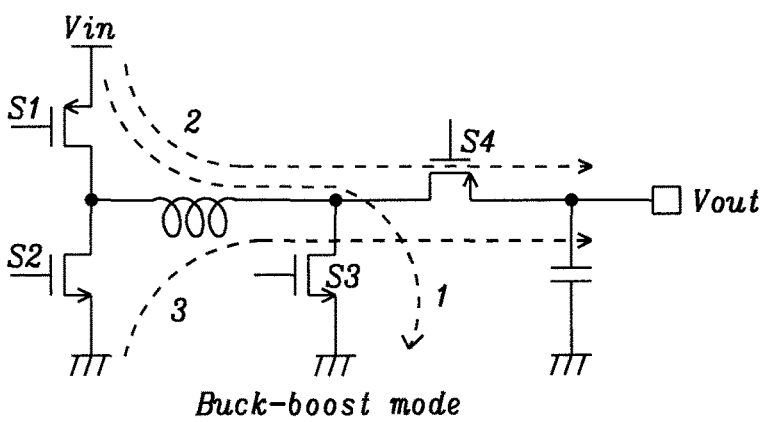
FIG. 8 illustrates a buck-boost converter operating in buck-boost mode.
Figure 9:
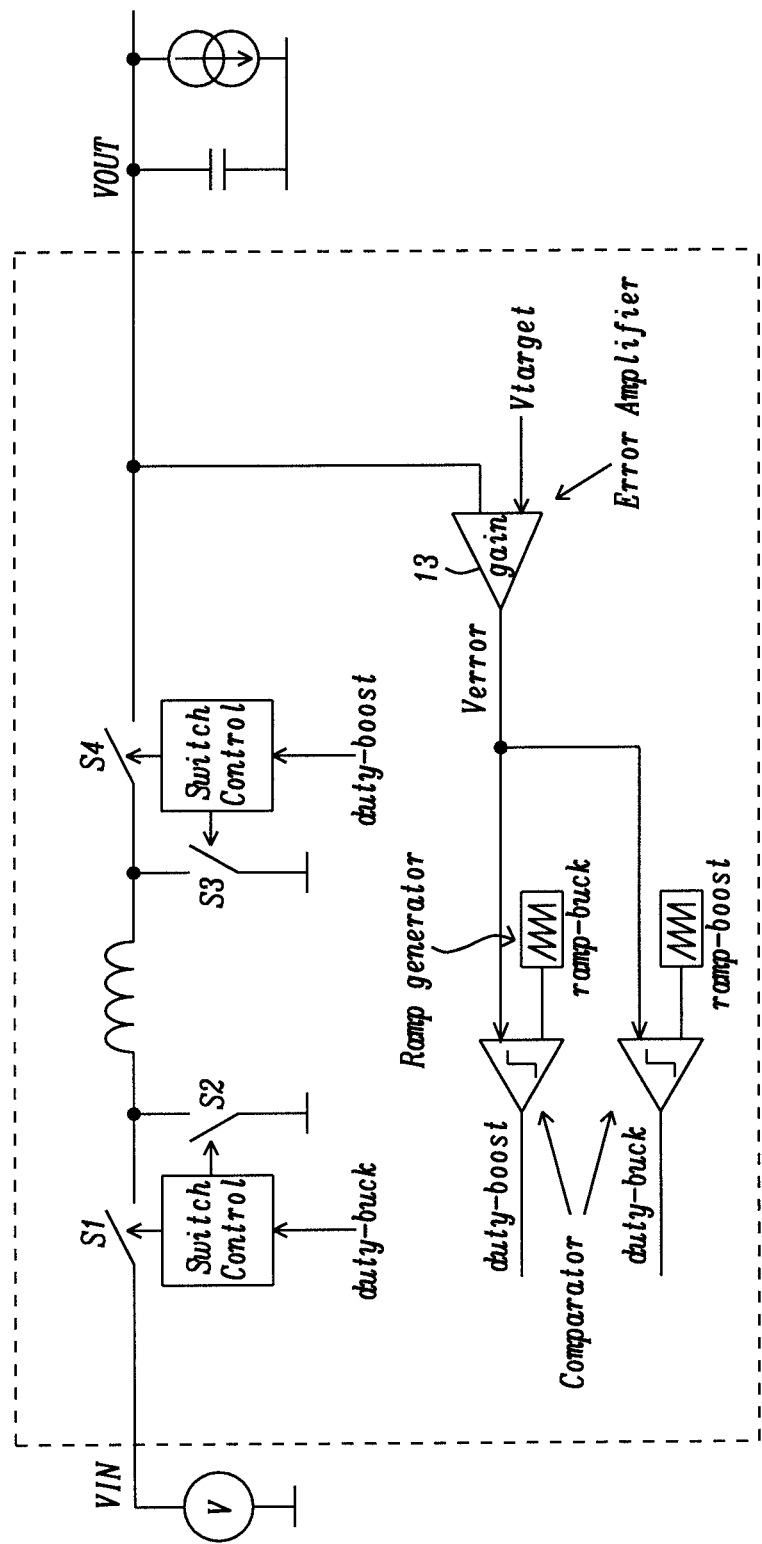
FIG. 9 illustrates a buck-boost control implementation.
Figure 10:
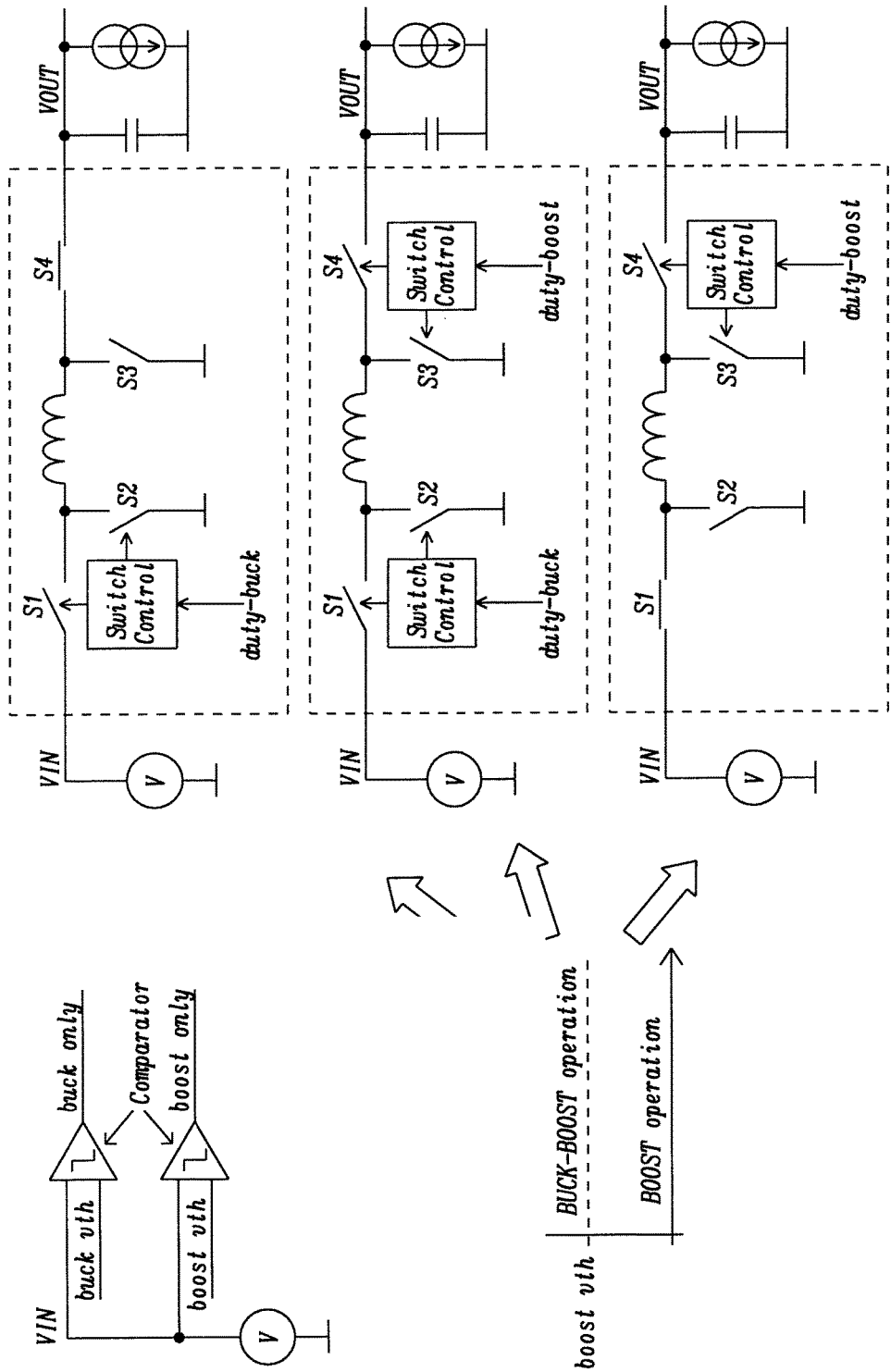
FIG. 10 illustrates an approach for controlling a buck-boost converter by monitoring the input voltage.

FIG. 5 schematically illustrates an exemplary current mode buck-boost converter 6. Most of the entities of the current mode buck-boost converter 6 are similar or identical to corresponding entities discussed with regard to the voltage mode buck-boost converter 1, and like reference numerals denote like entities. However, in contrast to the voltage mode buck-boost converter 1, the current mode buck-boost converter 6 comprises a buck comparator 612 which is configured to generate the buck duty cycle signal by comparing the error voltage with an inductor input voltage indicative of a current at the input terminal of the inductor 10. For this purpose, a current sensor 613 may be provided at the input terminal of the inductor 10 which is coupled to an input of the buck comparator 612. In addition, a resistor 614 may be coupled between said input of the buck comparator 612 and ground. That is, instead of comparing the error voltage with a ramp voltage, a voltage variation is derived from the input terminal of the inductor 10 and compared with the error voltage.

Moreover, in the depicted example, a boost comparator 622 is configured to generate the boost duty cycle signal by comparing the error voltage with a boost inductor output voltage, wherein an inductor output voltage is indicative of a current at an output terminal of the inductor 10 and the boost inductor output voltage is indicative of a sum of the inductor output voltage and the offset voltage generated by the offset voltage determination unit 65. As can be seen in FIG. 5, an adder unit 64 may be provided to add the offset voltage to the inductor output voltage. For obtaining the inductor output voltage, a current sensor 623 may be provided at the output terminal of the inductor 10. The current sensor 623 may be coupled to an input of the buck comparator 622 via the adder unit 64. In addition, a resistor 624 may be coupled between the current sensor 623 and ground.

It should be noted that the apparatus features described above correspond to respective method features that may however not be explicitly described, for reasons of conciseness. The disclosure of the present document is considered to extend also to such method features. In particular, the present disclosure is understood to relate to methods of operating the circuits described above.

It should further be noted that the description and drawings merely illustrate the principles of the proposed apparatus. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method. Furthermore, all statements herein providing principles, aspects, and embodiments of the invention, as well as specific examples thereof, are intended to encompass equivalents thereof.

What is claimed is:

1. A buck-boost converter with
    an inductor;
    a buck converter comprising a first switch and a second switch which are coupled to an input terminal of the inductor, the buck converter configured to control the first switch and the second switch according to a buck duty cycle based on a buck duty cycle signal;
    a boost converter comprising a third switch and a fourth switch which are coupled to an output terminal of the inductor, the boost converter configured to control the third switch and the fourth switch according to a boost duty cycle based on a boost duty cycle signal;
    a voltage feedback loop for regulating an output voltage at an output of the buck-boost converter, the voltage feedback loop comprising:
    an error voltage determination unit configured to determine an error voltage indicative of a difference between the output voltage and a target voltage,
    a buck comparator configured to generate the buck duty cycle signal by comparing the error voltage with a ramp voltage generated by a ramp voltage generator, and
    a boost comparator configured to generate the boost duty cycle signal by comparing a boost error voltage with the ramp voltage or by comparing the error voltage with a boost ramp voltage, wherein the boost error voltage is indicative of a sum of the error voltage and an offset voltage and the boost ramp voltage is indicative of a sum of the ramp voltage and the offset voltage; and
    a duty cycle feedback loop for adjusting the buck duty cycle and the boost duty cycle, the duty cycle feedback loop comprising an offset voltage determination unit connected to an output of the buck comparator for receiving the buck duty cycle signal and connected to an output of the boost comparator for receiving the boost duty cycle signal, wherein the offset voltage determination unit is configured to determine the offset voltage based on the received buck duty cycle signal generated by the buck comparator and based on the received boost duty cycle signal generated by the boost comparator,
    wherein the offset voltage determination unit is configured to determine the offset voltage such that the boost duty cycle is regulated towards a minimum boost duty cycle or such that the buck duty cycle is regulated towards a maximum buck duty cycle.

2. The buck-boost converter according to claim 1, wherein the offset voltage determination unit is configured to determine the offset voltage such that the boost duty cycle is regulated towards a minimum boost duty cycle when a buck duty cycle is smaller than a maximum buck duty cycle.

3. The buck-boost converter according to claim 2, wherein the offset voltage determination unit comprises a duty cycle selector and a control unit, and the duty cycle selector is configured to couple, when the buck duty cycle is smaller than the maximum buck duty cycle, the boost duty cycle signal as a controlled variable to the control unit and the minimum boost duty cycle as a set point to the control unit, and the control unit is configured to determine the offset voltage based on the boost duty cycle signal and the minimum boost duty cycle.

4. The buck-boost converter according to claim 1, wherein the offset voltage determination unit is configured to determine the offset voltage such that the buck duty cycle is regulated towards a maximum buck duty cycle when a buck duty cycle is larger than a maximum buck duty cycle.

5. The buck-boost converter according to claim 1, wherein the offset voltage determination unit is configured to determine the offset voltage such that the boost duty cycle is regulated towards a minimum boost duty cycle when a boost duty cycle of the boost converter is smaller than the minimum boost duty cycle.

6. The buck-boost converter according to claim 1, wherein the offset voltage determination unit comprises at least one of a proportional, an integral and a derivative controller.

7. The buck-boost converter according to claim 1, wherein the offset voltage determination unit comprises a loop filter configured to smooth the offset voltage at an output of the offset determination unit.

8. The buck-boost converter according to claim 1, wherein the offset voltage determination unit forms part of a delay line loop DLL.

9. The buck-boost converter according to claim 1, wherein the buck-boost converter is configured to switch each of the four switches once per clock cycle from an on-state to an off-state or vice versa.

10. The buck-boost converter according to claim 1, wherein the buck duty cycle and the boost duty cycle are synchronized by a clock signal.

11. The buck-boost converter according to claim 1, further comprising an error adder unit coupled to an output of the offset voltage determination unit and to an output of the error voltage determination unit, the error adder unit configured to generate the boost error voltage by adding the offset voltage and the error voltage, and to apply the boost error voltage an input of the boost comparator.

12. A buck-boost converter with
an inductor;
a buck converter comprising a first switch and a second switch which are coupled to an input terminal of the inductor, the buck converter configured to control the first switch and the second switch according to a buck duty cycle based on a buck duty cycle signal;
a boost converter comprising a third switch and a fourth switch which are coupled to an output terminal of the inductor, the boost converter configured to control the third switch and the fourth switch according to a boost duty cycle based on a boost duty cycle signal;
a voltage feedback loop for regulating an output voltage at an output of the buck-boost converter, the voltage feedback loop comprising:
an error voltage determination unit configured to determine an error voltage indicative of a difference between the output voltage and a target voltage,
a buck comparator configured to generate the buck duty cycle signal by comparing the error voltage with an inductor input voltage indicative of a current at the input terminal of the inductor, and
a boost comparator configured to generate the boost duty cycle signal by comparing a boost error voltage with an inductor output voltage or by comparing the error voltage with a boost inductor output voltage, wherein the inductor output voltage is indicative of a current at the output terminal of the inductor, the boost error voltage is indicative of a sum of the error voltage and an offset voltage, and the boost inductor output voltage is indicative of a sum of the inductor output voltage and the offset voltage; and
a duty cycle feedback loop for adjusting the buck duty cycle and the boost duty cycle, the duty cycle feedback loop comprising an offset voltage determination unit connected to an output of the buck comparator for receiving the buck duty cycle signal and connected to an output of the boost comparator for receiving the boost duty cycle signal, wherein the offset voltage determination unit is configured to determine the offset voltage based on the received buck duty cycle signal generated by the buck comparator and based on the received boost duty cycle signal generated by the boost comparator,
wherein the offset voltage determination unit is configured to determine the offset voltage such that the boost duty cycle is regulated towards a minimum boost duty cycle or such that the buck duty cycle is regulated towards a maximum buck duty cycle.

13. A method for operating a buck-boost converter with an inductor, a buck converter comprising a first switch and a second switch which are coupled to an input terminal of the inductor, and a boost converter comprising a third switch and a fourth switch which are coupled to an output terminal of the inductor, the method comprising:
controlling the first switch and the second switch according to a buck duty cycle based on a buck duty cycle signal;
controlling the third switch and the fourth switch according to a boost duty cycle based on a boost duty cycle signal;
determining an error voltage indicative of a difference between an output voltage at an output of the buck-boost converter and a target voltage;
generating, by a buck comparator, the buck duty cycle signal by comparing the error voltage with a ramp voltage;
generating, by a boost comparator, the boost duty cycle signal by comparing a boost error voltage with the ramp voltage or by comparing the error voltage with a boost ramp voltage, wherein the boost error voltage is indicative of a sum of the error voltage and an offset voltage and the boost ramp voltage is indicative of a sum of the ramp voltage and the offset voltage; and
adjusting, by an offset voltage determination unit connected to an output of the buck comparator for receiving the buck duty cycle signal and connected to an output of the boost comparator for receiving the boost duty cycle signal, the buck duty cycle and the boost duty cycle by determining the offset voltage based on the received buck duty cycle signal and based on the received boost duty cycle signal; and
determining, by the offset voltage determination unit, the offset voltage such that the boost duty cycle is regulated towards a minimum boost duty cycle or such that the buck duty cycle is regulated towards a maximum buck duty cycle.

14. The method according to one of claim 13, further comprising determining the offset voltage such that the boost duty cycle is regulated towards a minimum boost duty cycle when a buck duty cycle is smaller than a maximum buck duty cycle.

15. The method according to one of claim 13, further comprising
determining the offset voltage such that the buck duty cycle is regulated towards a maximum buck duty cycle when a buck duty cycle is larger than a maximum buck duty cycle.

16. The method according to one of claim 13, further comprising
determining the offset voltage such that the boost duty cycle is regulated towards a minimum boost duty cycle when a boost duty cycle of the boost converter is smaller than the minimum boost duty cycle.

17. A method for operating a buck-boost converter with an inductor, a buck converter comprising a first switch and a second switch which are coupled to an input terminal of the inductor, and a boost converter comprising a third switch and a fourth switch which are coupled to an output terminal of the inductor, the method comprising:
controlling the first switch and the second switch according to a buck duty cycle based on a buck duty cycle signal;

controlling the third switch and the fourth switch according to a boost duty cycle based on a boost duty cycle signal;

determining an error voltage indicative of a difference between an output voltage at an output of the buck-boost converter and a target voltage;

generating, by a buck comparator, the buck duty cycle signal by comparing the error voltage with an inductor input voltage indicative of a current at the input terminal of the inductor;

generating, by a boost comparator, the boost duty cycle signal by comparing a boost error voltage with an inductor output voltage or by comparing the error voltage with a boost inductor output voltage, wherein the inductor output voltage is indicative of a current at the output terminal of the inductor, the boost error voltage is indicative of a sum of the error voltage and an offset voltage, and the boost inductor output voltage is indicative of a sum of the inductor output voltage and the offset voltage; and adjusting, by an offset voltage determination unit connected to an output of the buck comparator for receiving the buck duty cycle signal and connected to an output of the boost comparator for receiving the boost duty cycle signal, the buck duty cycle and the boost duty cycle by determining the offset voltage based on the received buck duty cycle signal and based on the received boost duty cycle signal, and determining, by the offset voltage determination unit, the offset voltage such that the boost duty cycle is regulated towards a minimum boost duty cycle or such that the buck duty cycle is regulated towards a maximum buck duty cycle.

* * * * *